(12) United States Patent
Guerreiro et al.

(10) Patent No.: US 10,867,401 B2
(45) Date of Patent: Dec. 15, 2020

(54) METHOD AND DEVICE FOR THE ESTIMATION OF CAR EGO-MOTION FROM SURROUND VIEW IMAGES

(71) Applicant: Application Solutions (Electronic and Vision) Ltd., Burgess Hill (GB)

(72) Inventors: Rui Guerreiro, Hove (GB); Andreas Panakos, Neu-Ulm (DE); Carlos Silva, Eastbourne (GB); Dev Yadav, Abingdon (GB)

(73) Assignee: Application Solutions (Electronics and Vision) Ltd., West Sussex (GB)

( * ) Notice: Subject to any disclaimer, the term of this patent is extended or adjusted under 35 U.S.C. 154(b) by 237 days.

(21) Appl. No.: 15/678,774

(22) Filed: Aug. 16, 2017

(65) Prior Publication Data
US 2017/0345164 A1 Nov. 30, 2017

Related U.S. Application Data

(63) Continuation of application No. PCT/EP2016/050937, filed on Jan. 19, 2016.

(30) Foreign Application Priority Data

Feb. 16, 2015 (EP) .................................... 15155191

(51) Int. Cl.
*G06T 7/70* (2017.01)
*B60R 11/04* (2006.01)
(Continued)

(52) U.S. Cl.
CPC ............... *G06T 7/70* (2017.01); *B60R 11/04* (2013.01); *G06T 7/292* (2017.01); *G06T 7/80* (2017.01);
(Continued)

(58) Field of Classification Search
None
See application file for complete search history.

(56) References Cited

U.S. PATENT DOCUMENTS

| 2004/0247352 | A1 | 12/2004 | Oishi et al. |
| 2006/0140447 | A1* | 6/2006 | Park ..................... G06K 9/3241 382/104 |

(Continued)

FOREIGN PATENT DOCUMENTS

| CN | 102654917 A | 9/2012 |
| CN | 102999759 A | 3/2013 |

(Continued)

OTHER PUBLICATIONS

Tsao, A.T., Fuh, C.S., Hung, Y.P., and Chen, Y.S.: Ego-motion estimation using optical flow fields observed from multiple cameras. In Proc. Computer Vision Pattern Recognition, pp. 457-462 (1997) (Year: 1997).*

(Continued)

*Primary Examiner* — Justin P. Misleh

(57) ABSTRACT

A method and device for determining an ego-motion of a vehicle are disclosed. Respective sequences of consecutive images are obtained from a front view camera, a left side view camera, a right side view camera and a rear view camera and merged. A virtual projection of the images to a ground plane is provided using an affine projection. An optical flow is determined from the sequence of projected images, an ego-motion of the vehicle is determined from the optical flow and the ego-motion is used to predict a kinematic state of the car.

9 Claims, 4 Drawing Sheets

(51) Int. Cl.
G06T 7/292 (2017.01)
G06T 7/80 (2017.01)
G06T 7/00 (2017.01)

(52) U.S. Cl.
CPC .......... *G06T 7/97* (2017.01); *B60R 2300/105* (2013.01); *G06T 2207/10016* (2013.01); *G06T 2207/30261* (2013.01)

(56) References Cited

U.S. PATENT DOCUMENTS

| | | | | |
|---|---|---|---|---|
| 2008/0319664 | A1* | 12/2008 | Kremin | G01C 21/005 701/469 |
| 2010/0027844 | A1* | 2/2010 | Akita | G06T 7/269 382/103 |
| 2010/0220190 | A1 | 9/2010 | Hiroshi | |
| 2011/0169957 | A1* | 7/2011 | Bartz | B60R 1/00 348/149 |
| 2011/0234800 | A1* | 9/2011 | Terasaki | H04N 5/04 348/148 |
| 2012/0262580 | A1 | 10/2012 | Huebner et al. | |
| 2016/0001704 | A1* | 1/2016 | Nakasho | G07C 5/0891 701/36 |

FOREIGN PATENT DOCUMENTS

| | | |
|---|---|---|
| CN | 104104915 A | 10/2014 |
| CN | 104318561 A | 1/2015 |
| EP | 2511137 A1 | 10/2012 |
| JP | 2001266160 A | 9/2001 |
| JP | 2004056763 A | 2/2004 |
| JP | 2011013978 A | 1/2011 |
| JP | 2011070580 A | 4/2011 |
| JP | 2012227913 A | 11/2012 |

OTHER PUBLICATIONS

Andrea Giachetti et al: "The Use of Optical Flow for Road Navigation" IEEE Transactions on Robotics and Automation, vol. 14 No. 1, Feb. 1, 1998, p. 34-47.
International Search Report and Written Opinion dated Apr. 29, 2016 from corresponding International Patent Application No. PCT/EP2016/050937.
Nourani-Vatani, et al: "Practical Visual Odometry for Car-like Vehicles," 2009 IEEE International Conference on Robotycs and Automation, Kobe, Japan, May 12-17, 2009.
European Search Report dated Sep. 17, 2015 for corresponding German Patent Application No. 15155191.8.
Jazar Reza N., "Vehicle Dynamics: Theory and Applications", Springer, Mar. 19, 2008.
Gillespie, Thomas D., "Fundamentals of Vehicle Dynamics". Society of Automotive Engineers, 1992.
Kelly, Alonzo, "Essential Kinematics for Autonomous Vehicles", Robotics Institute, Carnegie Mellon University, 1994.
Stein, Gideon P. et al. "A Robust Method for Computing Vehicle Ego-motion", IEEE Intelligent Vehicles Symposium, 2000.
Barreto Joao P. et al, "Visual Servoing/Tracking Using Central Catadioptric Images", Int. Sym-posium on Experimental Robotics, Advanced Robotics Series, 2002.
Weinstein, Alejandro J. et al, "Pose Estimation of Ackerman Steering Vehicles for Outdoors Autonomous Naviga-tion", Proceedings of 2010 IEEE International Conference on Industrial Automation, Valparaiso, Chile, Mar. 2010.
Pink, Oliver et al, "Visual Features for Vehicle Localization and Ego-Motion Estimation", proceeding of: Intelligent Vehicles Symposium, 2009 IEEE.
Cheda, D et al, "Camera Egomotion Estimation in the ADAS Context", Annual Conference on Intelligent Transportation Systems, 2010.
Lee, Gim Hee, "Motion Estimation for Self-Driving Cars with a Generalized Camera", CVPR, 2013.
Zucchelli Marco, et al, "Constrained Structure and Motion Estimation from Optical Flow", ICPR 2002.
Simon, Dan et al, "Optimal State Estimation: Kalman, H Infinity and Nonlinear Approaches", John Wiley & Sons, 2006.
Power, P. Wayne et al, "Understanding Background Mixture Models for Foreground Segmentation", Proceedings Im-age and Vision Computing New Zealand 2002.
Japanese Office Action dated Aug. 14, 2019 for corresponding Japanese Patent Application No. 2017-530610.
Chinese Office Action dated Jul. 31, 2020 for the counterpart Chinese Patent Application 201680005504.X.

* cited by examiner

METHOD AND DEVICE FOR THE ESTIMATION OF CAR EGO-MOTION FROM SURROUND VIEW IMAGES

CROSS-REFERENCE TO RELATED APPLICATIONS

This application claims the benefit of PCT Application PCT/EP2016/050937, filed Jan. 19, 2016, which claims priority to European Application EP 15155191.8, filed Feb. 16, 2015. The disclosures of the above applications are incorporated herein by reference.

TECHNICAL FIELD

The disclosure relates to driver assistance systems.

BACKGROUND

Advanced driver assistance systems (ADAS) are systems developed to automate and enhance vehicle systems for safety and better driving. Many driver assistance systems use information about a car's position, orientation and motion state to assist the driver in various ways. This information may even be used to drive the vehicle autonomously.

Among others, visual odometry can be used to determine a car's position. In a system for visual odometry, cameras are used to record input images and image corrections are applied. Features are detected, the features are matched across image frames and an optical flow field is constructed, for example by using a correlation to establish a correspondence between two images, by feature extraction and correlation or by constructing an optical flow field using the Lucas-Kanade method. Odometry errors are detected, the corresponding outliers are removed and the camera motion is estimated from the optical flow, for example using a Kalman filter or by minimizing a cost function that is based on geometric properties of the features. In some examples, multi-camera top view vision system generate a stitched virtual top view image.

The following references [1] to [12] relate to the subject matter of the present disclosure and are hereby incorporated by reference.

[1] Reza N. Jazar, "Vehicle Dynamics: Theory and Applications", Springer, Mar. 19, 2008.

[2] Thomas D. Gillespie, "Fundamentals of Vehicle Dynamics". Society of Automotive Engineers, 1992.

[3] Alonzo Kelly, "Essential Kinematics for Autonomous Vehicles", Robotics Institute, Carnegie Mellon University, 1994.

[4] Gideon P. Stein, Ofer Mano, Amnon Shashua. "A Robust Method for Computing Vehicle Ego-motion", IEEE Intelligent Vehicles Symposium, 2000.

[5] Joao P. Barreto, Frederick Martin, Radu Horaud. "Visual Servoing/Tracking Using Central Catadioptric Images", Int. Symposium on Experimental Robotics, Advanced Robotics Series, 2002.

[6] Alejandro J. Weinstein and Kevin L. Moore, "Pose Estimation of Ackerman Steering Vehicles for Outdoors Autonomous Navigation", Proceedings of 2010 IEEE International Conference on Industrial Automation, Valparaiso, Chile, March 2010.

[7] Oliver Pink, Frank Moosmann, Alexander Bachmann, "Visual Features for Vehicle Localization and Ego-Motion Estimation", proceeding of: Intelligent Vehicles Symposium, 2009 IEEE.

[8] D. Cheda, D. Ponsa, A. M. Lopez, "Camera Egomotion Estimation in the ADAS Context", Annual Conference on Intelligent Transportation Systems, 2010.

[9] Gim Hee Lee, Friedrich Fraundorfer, Marc Pollefeys, "Motion Estimation for Self-Driving Cars with a Generalized Camera", CVPR, 2013.

[10] Marco Zucchelli, Jose Santos-Victor, Henrik I. Christensen, "Constrained Structure and Motion Estimation from Optical Flow", ICPR 2002.

[11] Dan Simon, "Optimal State Estimation: Kalman, H Infinity and Nonlinear Approaches", John Wiley & Sons, 2006.

[12] P. Wayne Power, Johann. A Schoones, "Understanding Background Mixture Models for Foreground Segmentation", Proceedings Image and Vision Computing New Zealand 2002.

The references [1], [2], [3] explain models of vehicle kinematics that can be used in an ego-motion context.

Stein et alii [4] propose a single camera application where the ego-motion of the vehicle is consistent with the road modelled. Image features in the two images are combined in a global probability function that introduces a global constraint to cope with the aperture problem.

Barreto et al. [5] describe a visual control of robot motion using central catadioptric systems and present the Jacobian matrix linking the robot's joint velocities to image observations. The solution presented is treated as a least squares problem but they actually defined the state vector that can be used in an Extended Kalman Filter.

Alejandro et al. [6] study a localization scheme for Ackerman steering vehicles, to be used in outdoors autonomous navigation using a low cost GPS and inclinometer. They use an Extended Kalman Filter to estimate the pose of the vehicle and the sensor biases.

Pink et al. [7] present a method for vehicle pose estimation and motion tracking using visual features. They assume an initial vehicle pose and then track the pose in geographical coordinates over time, using image data as the only input. They are tracking the vehicle position based on the Ackerman model.

Cheda et al. [8] study ego-motion estimation from a monocular camera under the ADAS context and compare the performance of nonlinear and linear algorithms.

Lee et al. [9] present a visual ego-motion estimation algorithm for a self-driving car. They model a multicamera system as a generalized camera and applying the nonholonomic motion constraint of a car.

Marco et al. [10] provide a formulation of a constrained minimization problem for structure and motion estimation from optical flow. He also presents the solution of the optimization problem by Levenberg-Marquardt and direct projection.

Dan Simon [11] proposes multiple-model estimation methods on page 301, section 10.2, in which the update phase of the Kalman filter is reformulated to weight different models.

Power and Schoones [12] describe a Gaussian mixture model (GMM) algorithm and an approximation on expectation maximization.

SUMMARY

According to the present disclosure, an ego-motion of a vehicle is defined as the 3D motion of a camera relative to a fixed coordinate system of the environment, which is also known as a world coordinate system. Furthermore, ego-motion also refers to a two-dimensional motion in a given plane of the three-dimensional world coordinate system. This ego-motion is also referred to as "2D egomotion".

In some implementations, the ego-motion is calculated from an optical flow. The optical flow is the apparent motion of an image caused by the relative between a camera and the scene, where "scene" refers to the objects in the surroundings of the car.

In some examples, an Ackermann model of the steering geometry is used to describe the vehicle motion and an incremental pose update as a framework to integrate multiple sources of vehicle pose.

The optical flow is calculated using features that are detected in an image frame of a sequence of images and then matched in a consecutive frame. This information is used to generate the optical flow field for the detected features in those two image frames, or consecutive images. The consecutive images are a projection of the three dimensional scene into a two-dimensional plane, which is also referred to as "viewport plane".

A model of the road may be used to simplify the estimation of the optical flow. The road forms a simple planar structure and can be represented by only three dominant parameters: the forward translation, the pitch, and the yaw. However, in some implementations, the ego-motion can also be estimated with sufficient accuracy without the use of a road model.

In some implementations, a Horn-Schunck method is used to estimate the optical flow. A global constraint is introduced to solve the aperture problem and a road model is fitted to the flow fields to remove outliers.

In some examples, a four camera setup of a surround view system is used to generate a surround view, the images of the four cameras are merged into a single projection to a ground plane, which represents the street level and which is also referred to as "top down view".

A 2D-egomotion is computed from an affine projection of the top down view. Flow field outliers, such as measurement errors or vectors of moving objects are filtered out using a suitable procedure, such as RANSAC.

The projected view, which is an affine projection of the surround view to the ground plane, is interpreted using a prior calibration, which provides depth and scale information. Alternatively or in addition, a structure is reconstructed from motion algorithms, which gives an explicit reconstruction of the observed scenes and thereby provides an estimate of object distances.

In some implementations, the motion is filtered in order to obtain a consistent position over time. The tracking process estimates the real position of the vehicle with a consistent movement model. According to the present disclosure, an Ackermann steering model is used as movement model to represent a vehicle with an Ackermann steering geometry.

In some examples, the Ackermann model is combined with multiple odometric measurements, such as GPS measurement, vehicle sensors, etc.

One aspect of the disclosure provides a method for determining an ego-motion of a motor vehicle, such as a passenger car, a utility vehicle or a minibus.

A front view camera records a first sequence of consecutive images of, a left side view camera records a second sequence of consecutive images, a right side view camera records a third sequence of consecutive images, and a rear view camera records a fourth sequence of consecutive images. The first, second, third and fourth image sequences each include at least two consecutive images.

The image sequences are transferred to a computational unit of the motor vehicle. The computational unit merges the first sequence of consecutive images, the second sequence of consecutive images, the third sequence of consecutive images, and the fourth sequence of consecutive images to obtain a sequence of merged images. The merged images correspond to surround view or 360° view of the vehicle's surroundings at a given time.

In some examples, the respective images and the view fields of adjacent cameras overlap at least partially. By way of example, the images can be merged by matching brightness values, based on the individual pixels, correlating the brightness of the pixels. In some implementations, higher level features such as lines or edges or regions of high contrast or brightness gradient of images from adjacent cameras are matched to each other. The images may be merged according to a field of view, position and orientation of the cameras.

The images of the sequence of merged images, or patches thereof, are projected to a ground plane using an affine projection or transformation, thereby providing a sequence of projected images. Furthermore, a two-dimensional optical flow is determined, based on the sequence of projected images. The optical flow includes motion vectors of target objects in the surroundings of the vehicle. In some examples, an optical flow at a given time is provided by comparing two projected images, which are consecutive in time.

An ego-motion of the vehicle is based on the optical flow. For example, it is derived by comparing projected images of a first and of a second time and by determining the amount by which a pixel or a group of pixels corresponding to an object in the surroundings has moved. The ego-motion may be derived from the individual camera images of the surround view system or from the merged image of all cameras of the surround view system.

A kinematic state of the vehicle, such as a position, a speed or a movement is determined based on the ego-motion of the vehicle. The kinematic state may be determined with respect to a previous position of the car, to a fixed coordinate system, to an object in the surroundings, or to the instantaneous center of curvature.

In some implementations, the derivation of the ego-motion includes deriving an angular velocity of the vehicle around an instantaneous center of curvature from the optical flow and using the derived angular velocity to derive a velocity of the vehicle, and in particular to derive a velocity of a center of gravity of the vehicle in a plane that is parallel to a ground plane using an Ackermann steering model.

In some examples, the determination of the ego-motion includes deriving a current position vector of a target object on a ground plane and a current velocity relative to the target object using a previous position of the target object, a previous velocity relative to the target object, and an angular velocity with respect to a rotation around an instantaneous center of curvature with respect to a yaw motion of the vehicle.

In some implementations, the Ackermann steering model is used to derive an angular velocity of a yaw motion of the vehicle around an instantaneous center of curvature from a wheel speed and a steering angle. For example, the obtained angular speed can be merged with the derived ego-motion in an incremental pose update and it can used as a further input to a prediction filter, such as a Kalman filter. Alternatively, other filters, such as a recursive double least squares estimator or a double exponential smoothing filter or other smoothing filters, such as various types of low pass filters for digital signal processing, may be used as well.

In some implementations, kinematic states of the vehicle, which are obtained from different sources, such as the derived vehicle ego-motion, vehicle sensors and a GPS system, are used as an input to the same prediction filter, or they are used as inputs to different prediction filters and the resulting outputs of the different prediction filters are combined to form an estimate of the kinematic state of the vehicle.

In some examples, the different sources of vehicle motion can be merged or combined in a probabilistic framework. A likelihood of being correct is determined for each source given a previous measurement. The pose is then updated with the most correct source. In some examples, the different sources of vehicle motion are mixed in a Gaussian mixture model.

In some implementations, deriving the ego-motion from the optical flow includes applying a random sample consensus (RANSAC) procedure to motion vectors, which may be motion vectors of the optical flow or ego-motion vectors. The RANSAC procedure may be applied before and/or after applying a prediction filter, such as a Kalman filter. According to the RANSAC procedure, a model is fitted by regression to a subset of the data and the quality of the model is evaluated by measuring the data inliers to the model. The process is repeated until the solution has a pre-determined statistical significance.

In some examples, a sample subset containing minimal data items is randomly selected from the input dataset in a first step. A fitting model and the corresponding model parameters are computed using only the elements of this sample subset. The size of the sample subset is the smallest sufficient to determine the model parameters. In a second step, the algorithm checks which elements of the entire dataset are consistent with the model instantiated by the estimated model parameters obtained from the first step. A data element will be considered as an outlier if it does not fit the fitting model instantiated by the set of estimated model parameters within some error threshold that defines the maximum deviation attributable to the effect of noise.

In some implementations, the determination of the ego-motion includes deriving motion vectors of individual target objects from the optical flow, deriving a vector of ego-motion, also referred to as an average motion vector, from the motion vectors of the optical flow. A prediction filter such as a Kalman filter is applied to the vector of ego-motion for predicting a future vector of ego-motion or a future position of the vehicle for tracking the vehicle's position.

In some examples, an input to the prediction filter is derived from one or more vectors of ego-motion and motion sensor values, such as wheel speed sensor, acceleration sensor and GPS system output. Image regions may be detected that correspond to objects that are not located at a ground level and the detected image regions are disregarded or masked out.

Another aspect of the disclosure provides a computer program product, such as an executable file in a persistent memory, such as a memory stick, a hard-disk or a DVD, or in volatile memory, such as a computer RAM. The executable file or executable code causes a processing unit to execute one of the preceding methods when it is loaded into a program memory of a processor.

Yet another aspect of the disclosure provides an Ego-motion detection system for a motor vehicle. The Ego-motion detection system includes a computation unit, the computation that has a first input connection for receiving data from a front view camera, a second input connection for receiving data from a right side view camera, a third input connection for receiving data from left side view camera and, a fourth input connection for receiving data from a rear view camera.

The four input connections may also be realized by a single input connection, for example, if image data from the respective cameras is transmitted in alternating time slices or alternating data chunks. In particular, the camera data may be transmitted via cables of a data bus.

The computation unit includes a processing unit, such as a microprocessor with a computer memory, which is operative to obtain a first sequence of consecutive images from the front view camera, a second sequence of consecutive images from the left side view camera, a third sequence of consecutive images from the right side view camera, and a fourth sequence of consecutive images from the rear view camera via respective the input connections.

Furthermore, the camera or the cameras may comprise a camera processing unit for basic image processing. The camera processing unit is different from the main processing unit that does the ego-motion calculation.

Furthermore, the processing unit is operative to merge the first sequence of consecutive images, the second sequence of consecutive images, the third sequence of consecutive images, and the fourth sequence of consecutive images to obtain a sequence of merged images, and to provide a virtual projection of the images of the sequence of merged images or patches thereof to a ground plane using an affine projection or transformation thereby obtaining a sequence of projected images.

Herein, a virtual projection refers to the operation of mapping the content of a first memory area to the content of a second memory area according to a transformation algorithm of the projection.

Moreover, the processing unit is operative to determine an optical flow, based on the sequence of projected images, to determine an ego-motion of the vehicle based on the optical flow and to predict a kinematic state of the car based on the ego-motion. The optical flow includes motion vectors of target objects in the surroundings of the vehicle.

Furthermore, the current disclosure discloses the aforementioned ego-motion detection system with a front view camera that is connected to the first input, a right side view camera that is connected to the second input, a left side view camera that is connected to the third input, a rear view camera that is connected to the fourth input.

Moreover, the disclosure provides a car or a motor vehicle with the aforementioned ego-motion detection system, wherein the front view camera is provided at a front side of the car, the right side view camera is provided at a right side of the car, the left side view camera is provided at a left side of the car, and the rear view camera is provided at a rear side of the car.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
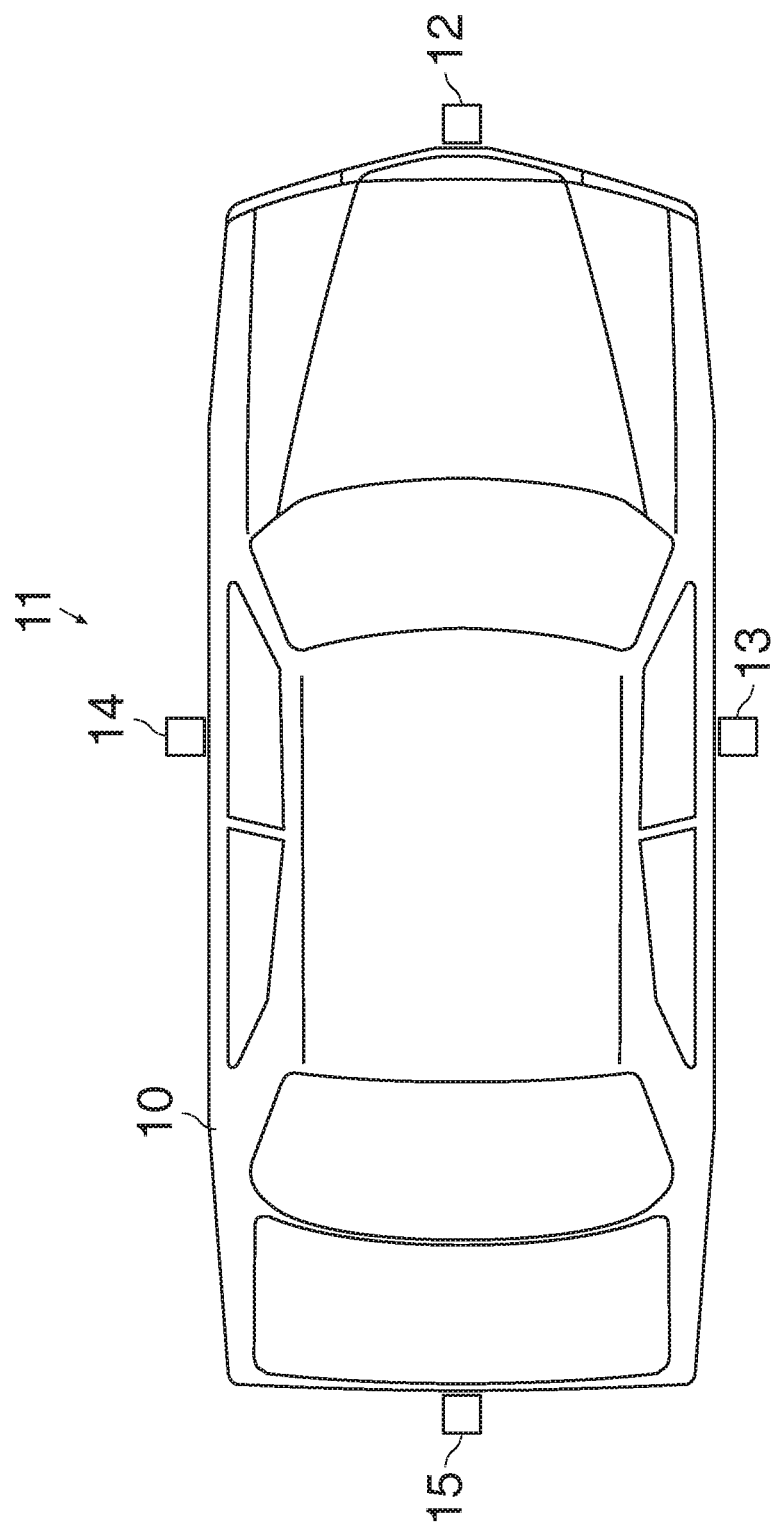
FIG. 1 shows a car with a surround view system.

FIG. 1 shows a car 10 with a surround view system 11. The surround view system 11 includes a front view camera 12, a right side view camera 13, a left side view camera 14 and a rear view camera 15. The cameras 11-14 are connected to a CPU of a controller, which is not shown in FIG. 1. The controller is connected to further sensors and units, such as a velocity sensor, a steering angle sensor, a GPS unit, and acceleration and orientation sensors.

Figure 2:
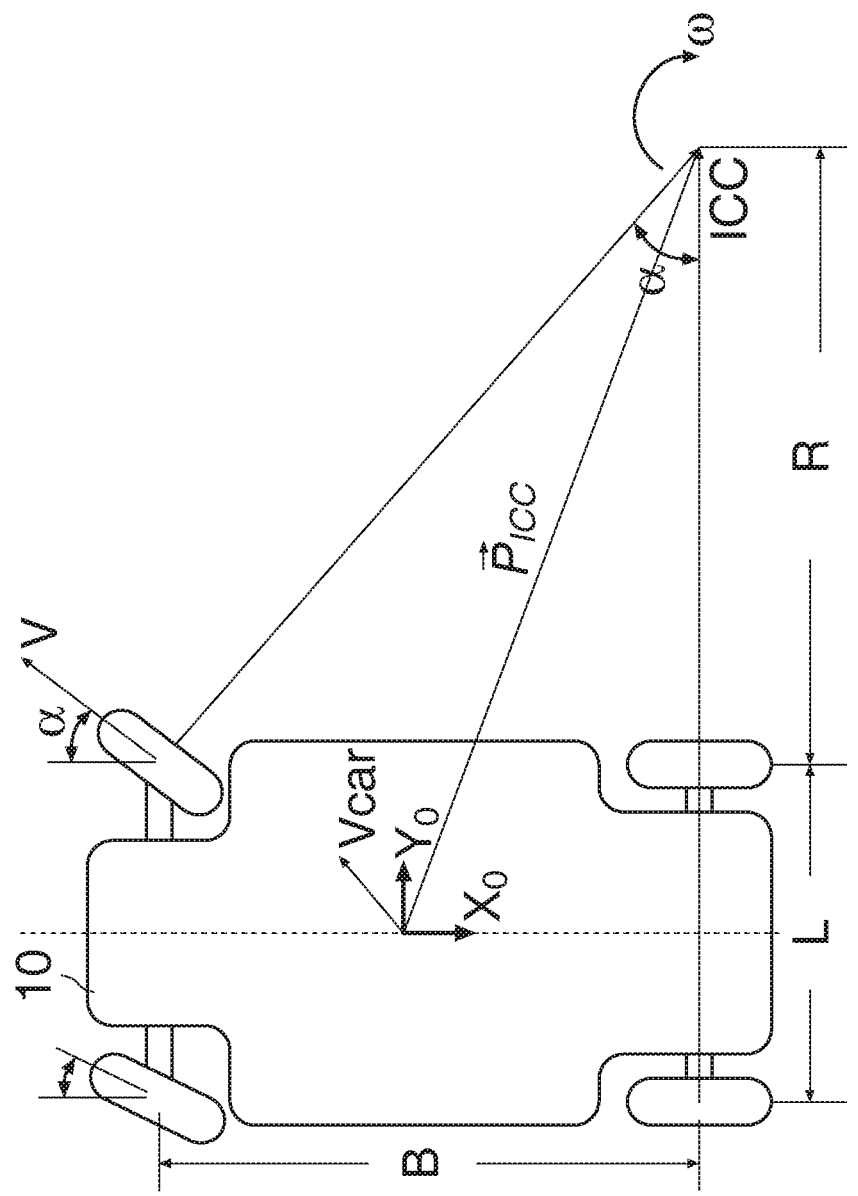
FIG. 2 illustrates a car motion of the car of FIG. 1 around an instantaneous center of rotation.

FIG. 2 illustrates a car motion of the car 10. A wheel base B of the car and a wheel track L are indicated. The car 10 is designed according to an Ackermann steering geometry in which an orientation of the steerable front wheels is adjusted such that all four wheels of a vehicle are oriented in tangential direction to a circle of instant rotation. An instantaneous center of curvature "ICC" is in register with the rear axis of the car 10 at a distance R, where R is the radius of the car's instant rotation with respect to the yaw movement.

A two-dimensional vehicle coordinate system is indicated, which is fixed to a reference point of the car and aligned along a longitudinal and a lateral axis of the car. A location of the instantaneous center of curvature relative to the vehicle coordinate system is indicated by a vector $\vec{P}_{ICC}$.

In an Ackermann steering geometry according to FIG. 2, an angle α between an inner rear wheel, the instant center of curvature and an inner front wheel is equal to a steering angle α of the inner front wheel. Herein, "inner wheel" refers to the respective wheel that is closer to the center of curvature. A motion of the inner front wheel relative to a ground plane is indicated by a letter v.

Figure 3:
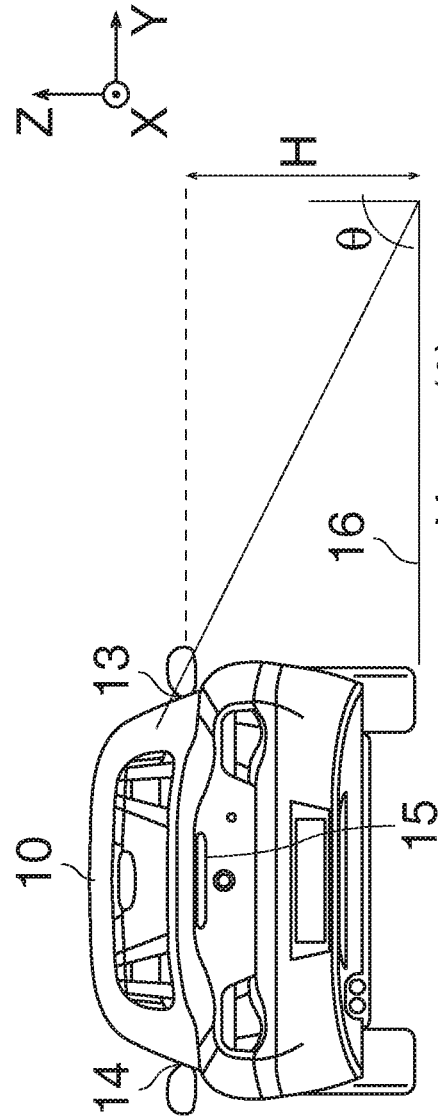
FIG. 3 illustrates a projection to a ground plane of an image point recorded with the surround view system of FIG. 1.

FIG. 3 shows a projection of an image point to a ground plane 16. An angle of inclination θ relative to the vertical may be estimated from a location of the image point on the image sensor of the right side view camera 13. If the image point corresponds to a feature of the road, the location of the corresponding object point is the projection of the image point onto the ground plane. In the example of FIG. 3, the camera 13 has an elevation H above the ground plane. Consequently, the corresponding object point is located at a distance H*cos(θ) from the right side of the car 10.

In some implementations, the vehicle 10 is tracked using a constant acceleration model and a one-step procedure, where the values of a car position x_k and a car velocity v=d/dt(x_k) at time k*Δt are predicted using the respective values of the position and velocity at the earlier time (k−1)*Δt according to the equations $$X_k = X_{k-1} + \dot{X}_{k-1} * \Delta t \quad (1)$$

$$\dot{X}_k = \omega \times X_{k-1} + \ddot{X}_{k-1} * \Delta t \quad (2)$$

or $$X_k = X_{k-1} + \dot{X}_{k-1} \quad (1a)$$

$$\dot{X}_k = \omega \times X_{k-1} + \ddot{X}_{k-1}, \quad (2a)$$

for time units in which Δt=1. Herein, $X_k$, $X_{k-1}$ refer to positions of the car relative to the vehicle coordinate system of FIG. 2, which is fixed to the car 10, where the positions $X_k$, $X_{k-1}$ of the car 10 are evaluated at times k*Δt, (k−1)*Δt, respectively, and where a position of the vehicle coordinate system is evaluated at time (k−1)*Δt.

The car velocity at the reference point may be derived from the location of the reference point relative to the instantaneous center of curvature and the current angular velocity according to:

$$\vec{V}_{car} = -\vec{\omega} \times \vec{P}_{ICC} \quad (3)$$

where $\vec{\omega}$ is a vector of instantaneous rotation and $\vec{P}_{ICC}$ is the position of the instantaneous center of curvature relative to the vehicle coordinate system. The relationship according to equation (3) is used in equations (2), (2a). In equations (1)-(2a) the vector arrows have been omitted for easier reading.

A vehicle position X_k' relative to a fixed reference frame, also known as "world coordinate system", is derived from the vector X_k and a location R of the vehicle coordinate system relative to the fixed reference frame. By way of example, the movement of the vehicle coordinate system may be derived using GPS and/or other sensors, such as a wheel speed sensor, a steering angle sensor, acceleration and orientation sensors.

In some implementations, the accuracy is improved by incorporating a time dependent acceleration according to:

$$\ddot{X}_k = \zeta \times X_{k-1} + \omega \times (\omega \times X_{k-1}) + \ddot{X}_{k-1}, \quad (4)$$

where ζ is related or proportional to the time derivative of the angular rotation ω. The first term on the right hand side of equation (4) is also referred to as "Euler acceleration" and the second term is also referred to as "Coriolis acceleration". Under the assumption that the car stays on track, the centrifugal acceleration is compensated by the car's tires and does not contribute to the vehicle motion.

In general, the angular velocity ω is time dependent. In some examples, the angular velocity ω at time (k−1)*Δt is used in a computation according to equations (2), (2a) or (3).

In some examples, a mean velocity v between times (k−2)*Δt and (k−1)*Δt can be derived from the comparison of two subsequent projections of camera images. In a first approximation, the mean velocity is used as the instant velocity at time (k−1)*Δt.

In some implementations, the angular velocity ω is derived from the steering angles of the front wheels and a rotation speed of a front wheel using an Ackermann steering model. The Ackermann steering model gives a good approximation for a car steering with Ackermann geometry, especially for slow velocities when there is little or no slip between the tires and the road.

The steering angle of the front wheels may in turn be derived from an angular position of the steering column and the known lateral distance L between the front wheels. In some examples, the ego-motion, which is derived from the image sequences of the vehicle cameras is used to derive the angular velocity ω.

With reference to FIG. 2, a radius of curvature R_2 with respect to the instantaneous curvature center and an inner front wheel can be derived as R_2=B/sin(a), where α is a steering angle of the inner front wheel and B is the wheel base of the car. If the inner front wheel moves with a velocity v, which can be derived from a rotation speed of the inner front wheel and the wheel's diameter, the angular velocity of the instantaneous rotation of the car in a horizontal plane, also known as "yaw", is ω=v/R_2=v*sin(α)/B.

For better accuracy, the instantaneous position may be computed using input from further odometric sensors, such as a GPS system, speed and acceleration sensors of the vehicle or other kinds of odometric sensors. For example, GPS position values can be used to correct a drift from the true position.

In some examples, the ego-motion is estimated from an affine projection or transformation to a ground plane, where the images of the cameras of the surround view system are merged into the projection to the ground plane.

Figure 4:
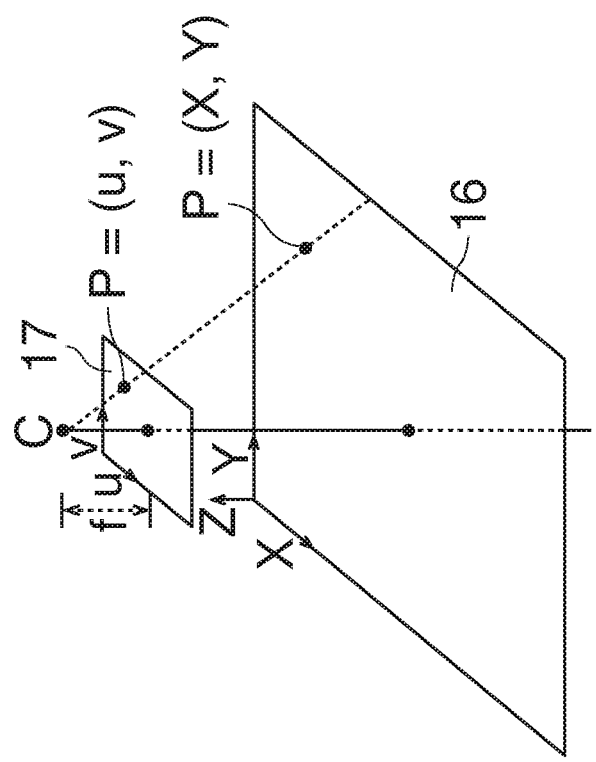
FIG. 4 illustrates in further detail the ground plane projection of FIG. 3.

FIGS. 3 and 4 show a projection to a ground plane 16. Under the assumption that an image point corresponds to an object point of an object on the ground plane the image point may be projected to a location of the corresponding object point on the ground plane. An angle θ of incidence is derived from a location of the image point on the camera sensor. A location Y of the projection is then derived using the height H of the camera sensor above street level as $Y=H*\cos(\theta)$.

FIG. 4 shows an isometric view of the affine projection of FIG. 3. In FIG. 4, a point in a view port plane 17 is denoted by $p=(u, v)$ and a corresponding point in the ground plane 16 is denoted by $P=(X, Y)$. A distance between the view port plane 17 and a projection center C is denoted by the letter "f".

In some implementations, the camera image is evaluated and the observed scene is reconstructed. In some examples, a sidewalk is detected and its height estimated. Stationary objects, such as a lamp post or a tree, may be detected and their orientation relative to the ground plane is estimated.

Objects which are not located at street level and/or which have a proper motion may distort the optic flow and lead to inaccuracies in the derived ego-motion. In some implementations, the optical flow vectors resulting from such objects are filtered out using a RANSAC (random sample consensus) procedure in which outliers are suppressed. In some examples, a road border is recognized using edge recognition and a digital map, which is stored in a computer memory of the car 10.

In some implementations, roll and a pitch motions of the car are determined, for example by using acceleration and/or orientation sensors of the car and the ego-motion vectors are corrected by subtracting or by compensating the roll and pitch motions.

According to further modifications, the derived ego-motion is used for a lane-keeping application or for other electronic stabilization applications.

Figure 5:
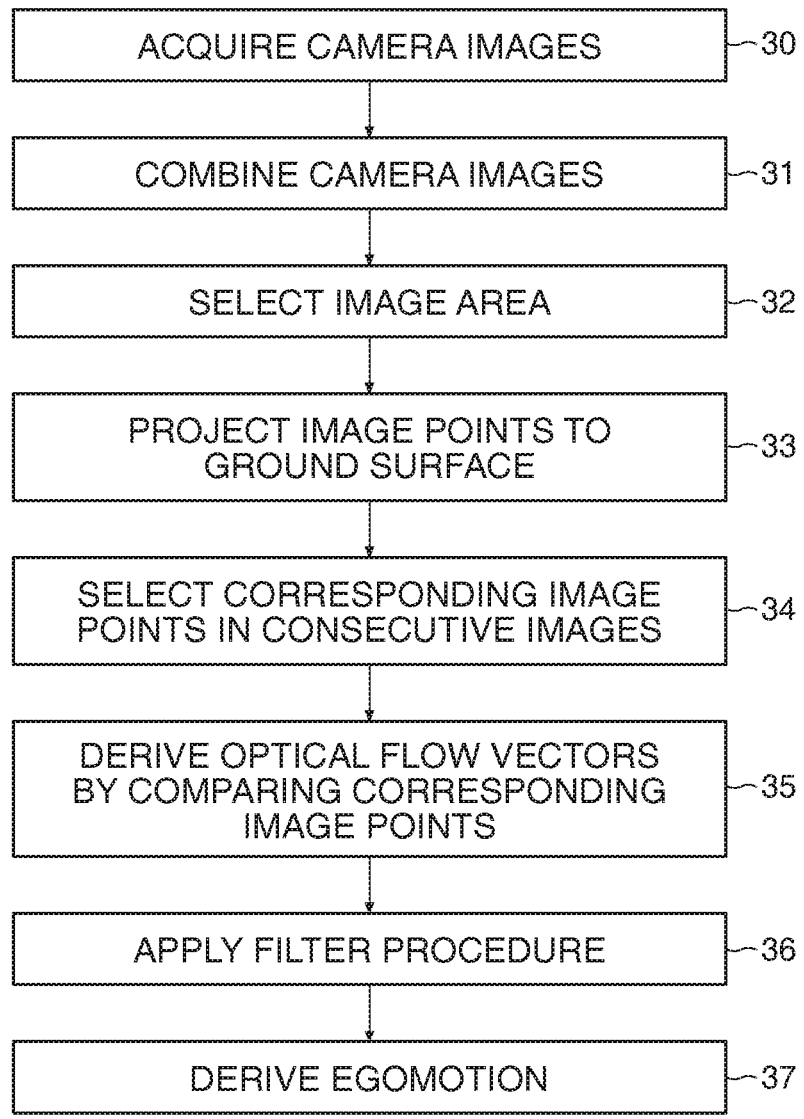
FIG. 5 shows a procedure for deriving an ego-motion of the car.

FIG. 5 shows, by way of example, a procedure for obtaining an ego-motion. In a step 30, camera images are acquired from the cameras 11-16. The camera images are combined into a combined image in a step 31. In a step 32, an image area is selected for the determination of ego-motion. For example, image areas that correspond to objects outside a street zone, such as buildings and other installations, may be clipped. In a step 33, the image points are projected to a ground surface, for example, by applying an affine transformation or a perspective projection.

In a step 34, corresponding image points are identified in consecutive images. In a step 35, optical flow vectors are derived by comparing the locations of the corresponding image points, for example by computing the difference vector between the position vectors of the corresponding locations. In a step 36, a filter procedure is applied, such as a RANSAC procedure or other elimination of outliers and interpolation or by applying a Kalman filter. In some examples, the filtering may involve storing image values, such as image point brightness values, of a given time window in computer memory and computing an average of the image values. In a step 37, an ego-motion vector of the car is derived from the optical flow.

The particular sequence of the steps FIG. 5 is only provided by way of example. For example, the images of the cameras may also be combined after carrying out the projection to ground level.

A number of implementations have been described. Nevertheless, it will be understood that various modifications may be made without departing from the spirit and scope of the disclosure. Accordingly, other implementations are within the scope of the following claims.

What is claimed is:

1. A method for determining an ego-motion of a vehicle, the method comprising:
   recording a first sequence of consecutive images of a front view camera, a second sequence of consecutive images of a left side view camera, a third sequence of consecutive images of a right side view camera, and a fourth sequence of consecutive images of a rear view camera;
   merging the first sequence of consecutive images, the second sequence of consecutive images, the third sequence of consecutive images, and the fourth sequence of consecutive images to obtain a sequence of merged images;
   providing a virtual projection of the images of the sequence of merged images to a ground plane using an affine projection, thereby obtaining a sequence of projected images;
   determining an optical flow, based on the sequence of projected images, the optical flow comprising motion vectors of target objects in the surroundings of the vehicle;
   determining an ego-motion of the vehicle based on the optical flow; and
   predicting a kinematic state of the vehicle based on the ego-motion;
   wherein the determination of the ego-motion comprises deriving a current position vector of a target object and a current velocity relative to the target object from a previous position of the target object, a previous velocity relative to the target object and an angular velocity with respect to a rotation around an instantaneous center of curvature.

2. The method of claim 1, wherein the determination of the ego-motion comprises:
   applying a RANSAC procedure to the motion vectors.

3. The method of claim 1, further comprising detecting image regions that correspond to objects that are not at a ground level and masking out/disregarding the detected image regions.

4. A method for determining an ego-motion of a vehicle, the method comprising:
   recording a first sequence of consecutive images of a front view camera, a second sequence of consecutive images of a left side view camera, a third sequence of consecutive images of a right side view camera, and a fourth sequence of consecutive images of a rear view camera;
   merging the first sequence of consecutive images, the second sequence of consecutive images, the third sequence of consecutive images, and the fourth sequence of consecutive images to obtain a sequence of merged images;
   providing a virtual projection of the images of the sequence of merged images to a ground plane using an affine projection, thereby obtaining a sequence of projected images;

determining an optical flow, based on the sequence of projected images, the optical flow comprising motion vectors of target objects in the surroundings of the vehicle;

determining an ego-motion of the vehicle based on the optical flow;

deriving an angular velocity of the vehicle around an instantaneous center of curvature from a wheel speed and a steering angle using an Ackermann steering model;

merging the determined ego-motion and the angular velocity of the vehicle in an incremental pose update; and predicting a kinematic state of the vehicle based on the ego-motion.

5. The method of claim 4, wherein the determination of the ego-motion comprises:

applying a RANSAC procedure to the motion vectors.

6. The method of claim 4, further comprising detecting image regions that correspond to objects that are not at a ground level and masking out/disregarding the detected image regions.

7. A method for determining an ego-motion of a vehicle, the method comprising:

recording a first sequence of consecutive images of a front view camera, a second sequence of consecutive images of a left side view camera, a third sequence of consecutive images of a right side view camera, and a fourth sequence of consecutive images of a rear view camera;

merging the first sequence of consecutive images, the second sequence of consecutive images, the third sequence of consecutive images, and the fourth sequence of consecutive images to obtain a sequence of merged images;

providing a virtual projection of the images of the sequence of merged images to a ground plane using an affine projection, thereby obtaining a sequence of projected images;

determining an optical flow, based on the sequence of projected images, the optical flow comprising motion vectors of target objects in the surroundings of the vehicle;

determining an ego-motion of the vehicle by
deriving vector of ego-motion from the motion vectors of the optical flow, and
applying a prediction filter to the vector of ego-motion for predicting a future position of the vehicle; and predicting a kinematic state of the vehicle based on the ego-motion.

8. The method of claim 7, wherein an input to the prediction filter is derived from one or more angular velocities.

9. The method of claim 7, further comprising detecting image regions that correspond to objects that are not at a ground level and masking out/disregarding the detected image regions.

* * * * *